United States Patent [19]
Albright

[11] Patent Number: 5,448,152
[45] Date of Patent: * Sep. 5, 1995

[54] BATTERY MANAGEMENT SYSTEM

[75] Inventor: Charles D. Albright, Hobe Sound, Fla.

[73] Assignee: Wells Marine Technology, Inc., Stuart, Fla.

[ * ] Notice: The portion of the term of this patent subsequent to Jul. 6, 2010 has been disclaimed.

[21] Appl. No.: 88,277

[22] Filed: Jul. 6, 1993

Related U.S. Application Data

[63] Continuation of Ser. No. 822,610, Jan. 15, 1992, Pat. No. 5,225,761.

[51] Int. Cl.$^6$ .............................................. H02J 7/00
[52] U.S. Cl. ........................................ 320/15; 320/2; 320/7
[58] Field of Search ................ 320/15, 2, 7, 16, 17

[56] References Cited

U.S. PATENT DOCUMENTS

| | | | |
|---|---|---|---|
| 3,129,372 | 4/1964 | Warren | 320/15 |
| 3,623,139 | 11/1971 | Dickerson | 320/22 |
| 3,656,044 | 4/1972 | King | 320/2 |
| 3,763,415 | 10/1973 | Ownby | 320/6 |
| 3,806,790 | 4/1974 | Marshall | 320/15 |
| 3,930,192 | 12/1975 | Dinkler | 320/15 |
| 4,004,208 | 1/1977 | Tamminen | 320/2 |
| 4,081,738 | 3/1978 | Roller | 320/7 |
| 4,090,122 | 5/1978 | Hoinski | 320/6 |
| 4,161,684 | 7/1979 | Ragaly | 322/90 |
| 4,282,475 | 8/1981 | Milton | 320/6 |
| 4,290,109 | 9/1981 | Taniguchi et al. | 364/481 |
| 4,297,629 | 10/1981 | Godard et al. | 320/7 |
| 4,348,628 | 9/1982 | Loucks | 320/61 |
| 4,544,910 | 10/1985 | Hoberman | 340/333 |
| 4,564,797 | 1/1986 | Binkley | 320/2 |
| 4,649,332 | 3/1987 | Bell | 320/7 |
| 4,698,580 | 10/1987 | Yang | 320/59 |
| 4,803,459 | 2/1989 | Ta | 340/52 |
| 4,965,462 | 10/1990 | Crawford | 307/66 |
| 4,990,885 | 2/1991 | Irick et al. | 340/455 |
| 5,047,961 | 10/1991 | Simonsen | 364/550 |
| 5,225,761 | 7/1993 | Albright | 320/15 |

Primary Examiner—Steven L. Stephan
Assistant Examiner—Nicholas Ponomarenko
Attorney, Agent, or Firm—Quarles & Brady

[57] ABSTRACT

A battery management system maintains a charge on at least one auxiliary battery by switching the auxiliary battery automatically into parallel with the main battery charging circuit or with the auxiliary load. The system uses the AC component of the charging signal of a vehicle or boat charging system to trigger switching circuits coupled to operate relays or similar switching means which couple the auxiliary battery to the main charging circuit. When no charging signal is present, i.e., when the vehicle or boat engine is turned off, the auxiliary battery is switched automatically out of the charging system and is charged and in condition for use. A delay circuit can be provided for providing non-shorting operation, especially for use with more than one auxiliary battery which batteries are charged in parallel and loaded in series, whereby the combined series voltage of the auxiliary batteries would exceed the vehicle or boat supply voltage. The timing circuits open the circuit from the auxiliary batteries to the vehicle or boat charging system prior to switching the batteries into a series configuration for use with a load requiring a voltage higher than the rated voltage of the charging system. The timing circuits thereby prevent momentary large currents upon changes of state.

20 Claims, 3 Drawing Sheets

BATTERY MANAGEMENT SYSTEM

This is a continuation of application Ser. No. 07/822,610, filed Jan. 15, 1992 now U.S. Pat. No. 5,225,761.

BACKGROUND OF THE INVENTION

1. Field of the Invention

This invention relates to a battery management system for maintaining a charge on auxiliary batteries. The invention specifically relates to a system for automatically coupling auxiliary batteries to the charging system of a vehicle or boat, enabling the auxiliary batteries to be charged from the vehicle or boat charging system when power is available due to operation of the vehicle or boat.

2. Prior Art

Electrical motors are known to run quietly and smoothly. For this reason, relatively small electric trolling motors are popular among anglers for positioning boats while fishing. Electric trolling motors typically are powered from auxiliary storage batteries. Serious fisherman are at disadvantage, however, due to the limited energy storage capabilities of typical storage batteries. For instance, modern electrical storage batteries used with electric trolling motors may provide only approximately three to four hours of usable power. Although At may be possible to use more batteries or larger ones, this can be impractical for reasons of space, weight and expense.

The short battery life of typical storage batteries often adversely affects the fishing enjoyment of serious fishermen. It may take hours to find a spot where the fish are biting or the fish may begin biting at a particular spot at a certain time of day. If the trolling motor batteries discharge completely shortly after the fisherman finds a fishing "hot-spot", one can appreciate the substantial frustration involved.

Serious fisherman may choose to carry spare batteries aboard for a day of fishing. While this may solve the problem of a shortened fishing day, the fisherman is substantially burdened by the need to charge, transport and stow the spare batteries on the boat. Typical lead-acid batteries used to provide electric power to trolling motors are very heavy. Furthermore, they are relatively large thereby taking up valuable space on a fishing boat. A leaking lead-acid battery poses additional problems in the form of potential acid burns to users and damage to the structure of the boat.

Whether or not a number of batteries are provided, the auxiliary batteries must be recharged after use. The batteries are normally removed from the boat, carried to the vicinity of a battery charger coupled to the AC mains, and attached to the charger for an extended period of time. The charger requires attention at least periodically, for example, to avoid overcharging. In the case of a plurality of auxiliary batteries, the user must be present to disconnect the charger when the charge is complete and to connect it to an additional battery or set of batteries.

Prior art battery management and charging systems have been devised, but known systems are unable to eliminate each of the above-listed problems with battery usage. For example, U.S. Pat. No. 3,656,044 - King discloses a self-contained battery charging apparatus for charging dead batteries. The apparatus comprises an internal combustion engine coupled to an alternator. The charger is transported to the dead battery and connected to the dead battery for applying charging current. Switching means are provided for connecting battery to the alternator to initiate charging of a completely dead battery.

U.S. Pat. No. 4,081,738 - Roller discloses a battery control apparatus for controlling trolling motor batteries. Roller discloses manually operated switches for coupling one or more batteries into a circuit and switching a pair of batteries into a parallel or series configuration across a load. The batteries are switchable for application of a remote charging device or for higher voltage (series) or lower voltage (parallel) use.

U.S. Pat. No. 4,090,122 - Hoinski discloses a device for selectively charging one of two batteries provided in an automobile. One battery is the main automobile battery, which powers the ignition and the like; the other is an auxiliary battery for use in providing electric power to auxiliary devices. Switching priority is established such that when the automobile main battery is less than fully charged, the charging system applies charging current to the automobile main battery. After sensing that the automobile main battery is fully charged, the system applies charging current to the auxiliary battery. When both. batteries are fully charged, the device disables the charging system as to both batteries. Charging initiation is a function of battery voltage.

U.S. Pat. No. 4,282,475 - Milton discloses a DC current supply which converts AC power from domestic mains to a direct current for charging automotive batteries. The disclosure includes a tension releasable power source connector for automatically disconnecting the charger from the source of house current when the vehicle is driven off.

U.S. Pat. No. 4,297,629 - Godard, et al. discloses an. automatic switching arrangement for switching a pair of batteries between parallel and series configurations. The batteries are switched into a parallel configuration while being charged. The batteries are switched into a series configuration for discharge. Charging means are not disclosed.

U.S. Pat. No. 4,348,628 - Loucks discloses a system for charging one of a pair of batteries while the companion battery is powering a vehicle electric motor. When the battery in use substantially weakens, the charged battery is switched into the circuit and the weakened battery is recharged, thus cycling between the two batteries.

U.S. Pat. No. 4,564,797 - Binkley discloses a three battery system for use on a vehicle. The system includes one main battery and two alternate batteries. Typically, the main battery is used to provide starting energy and the alternate batteries are connected in parallel for charging. When the main battery is discharged to a point that it lacks adequate charge to provide starting energy, the alternate batteries are switched into a series arrangement for charging the main battery.

Although these and other known devices provide switching means for switching batteries into various configurations, and for applying charging current to batteries, the art does not disclose or suggest a system for automatically switching a pair of auxiliary batteries into parallel configuration with both a main battery and a main battery charging system upon sensed activation of the charging system, and for automatically decoupling the auxiliary batteries from the charging system and coupling them in a series configuration to power a load when the charging system is not activated. The present invention entails a charging system which is particularly apt for maintaining the charge of auxiliary batteries such as trolling motor batteries in this manner, providing a completely automated charging system for constantly maintaining a charge on the auxiliary batteries from a main battery charging system arranged to charge the batteries to a standard charging voltage (e.g., 12 V), and for automatically switching the batteries into an optimum configuration for powering a load. The invention thus automatically enables charging or topping off the charge of auxiliary batteries such as trolling motor batteries while operating the primary boat engine on the trip to the fishing site, and loading of the auxiliary batteries for positioning the boat at the site, all at optimum voltages and without the need for operator intervention.

SUMMARY OF THE INVENTION

It is a general object of this invention to provide an automatic battery charging system for automatically maintaining a charge on auxiliary batteries.

A further object of this invention is to couple charging current to auxiliary batteries from a main battery charging system when charging of the main battery is sensed, and to couple the auxiliary batteries to a load when the main battery is not being charged.

These and other objects are accomplished by a battery management system for automatically maintaining a charge on at least one auxiliary battery by automatically switching the battery into the charging circuit used to charge the main engine battery on board a motor vehicle or boat. The system will automatically switch the battery out of the charging circuit for immediate use as a power source when the vehicle or boat charging system becomes inactive. Two or more auxiliary batteries can be provided and the coupling and decoupling of the auxiliary batteries to the charging system and to the load can be arranged such that the batteries are charged in parallel and loaded in series, thus providing optimum voltages for charging and loading, respectively. In addition to the automatic switching functions discussed, the system can also enable the user to select loading in parallel, for longer term operation at lower power.

The invention is arranged such that charging of the main battery is detected by sensing a time varying component of a charging signal. With the occurrence of ignition at the main (internal combustion) engine of a vehicle or boat, the vehicle or boat charging system begins delivering half-sinusoidal charging pulses to the on-board battery, developed by half wave rectification of the alternator output. Alternatively, upon rectification of 120 volt, 60 hz line current for use in a 12 volt battery charger, a time varying voltage along with a D.C. charging voltage will appear at the charger output where it is connected to the battery. A transformer has a primary winding in series with the charging circuit and a secondary winding coupled to a switching circuit. The current through the primary transformer winding induces a voltage in the secondary winding and operates the switching circuit. One or more relays solid state switches are operated by the switching circuit to couple the at least one auxiliary battery in parallel with the vehicle or boat main on-board battery. In this manner, the auxiliary battery is charged automatically by the vehicle, boat or 120 v, 60 hz powered charging system whenever the charging system is operated.

When the vehicle or boat main engine is switched off, the onboard battery charging system ceases operation due to the lack of rectified pulses from the alternator to the on-board battery. Likewise, when the 120 volt, 60 hz powered charging system for 12 volt batteries is switched off, the charging system ceases to operate due to the lack of a time varying voltage component associated with the charger output. In either case, no induced voltage signal is provided to the switching circuit, whereby the switching relays or the like change state, decoupling the auxiliary battery from the charging system circuit. The switching circuit is arranged to switch the auxiliary battery or batteries into parallel with the main battery for charging, and when decoupled from the main battery via the relays changing state, the auxiliary battery or batteries are coupled to a load circuit and are available for use.

In a preferred embodiment, the invention charges a pair of twelve volt (12 V) batteries in parallel with a main vehicle 12 V battery, and provides electric power to a twenty-four volt trolling motor power circuit. The auxiliary batteries are automatically series coupled to provide the necessary 24 volts to the trolling motor power circuit. The invention accomplishes the necessary switching without operator intervention; however it is also possible to enable operator selections, for example to select a low voltage operation of the trolling motor. Similarly, the trolling motor typically is provided with a variable voltage power supply for speed control, derived from the voltage of the auxiliary batteries. Preferably, the invention is also provided with a delay feature for delaying relay actuation or other means to prevent momentary high current conditions as may occur, for example, by applying the 24 volts of the series connected auxiliary batteries to the 12 volt rated charging system and main battery.

BRIEF DESCRIPTION OF THE DRAWING

There are shown in the drawings the embodiments of the invention which are presently preferred. It should be understood that the invention is not limited to the precise arrangements shown and discussed, which are exemplary rather than limiting. In the drawings.

DETAILED DESCRIPTION OF THE PREFERRED EMBODIMENTS

The invention comprises a battery management system which automatically switches auxiliary batteries into a main battery charging system concurrently with initiation of operation of the main battery charging system and automatically switches the batteries to power an auxiliary load when the main charging system is not operating.

Charging of the main battery can be detected by the occurrence of rectified pulses from the alternator or other electromechanical means for generating electrical power from operation of the engine. Typically, charging of the main battery in a vehicle or boat commences immediately upon ignition, and accordingly, the occurrence of ignition pulses on the primary winding of the ignition coil can also be used to sense operation of the main charging system. Preferably the output of the charging system is used to trigger switching. When charging of the main battery ceases, the invention automatically decouples the auxiliary batteries from the charging system, making the auxiliary batteries available for use in powering a load, without producing a drain on the main battery.

Figure 1:
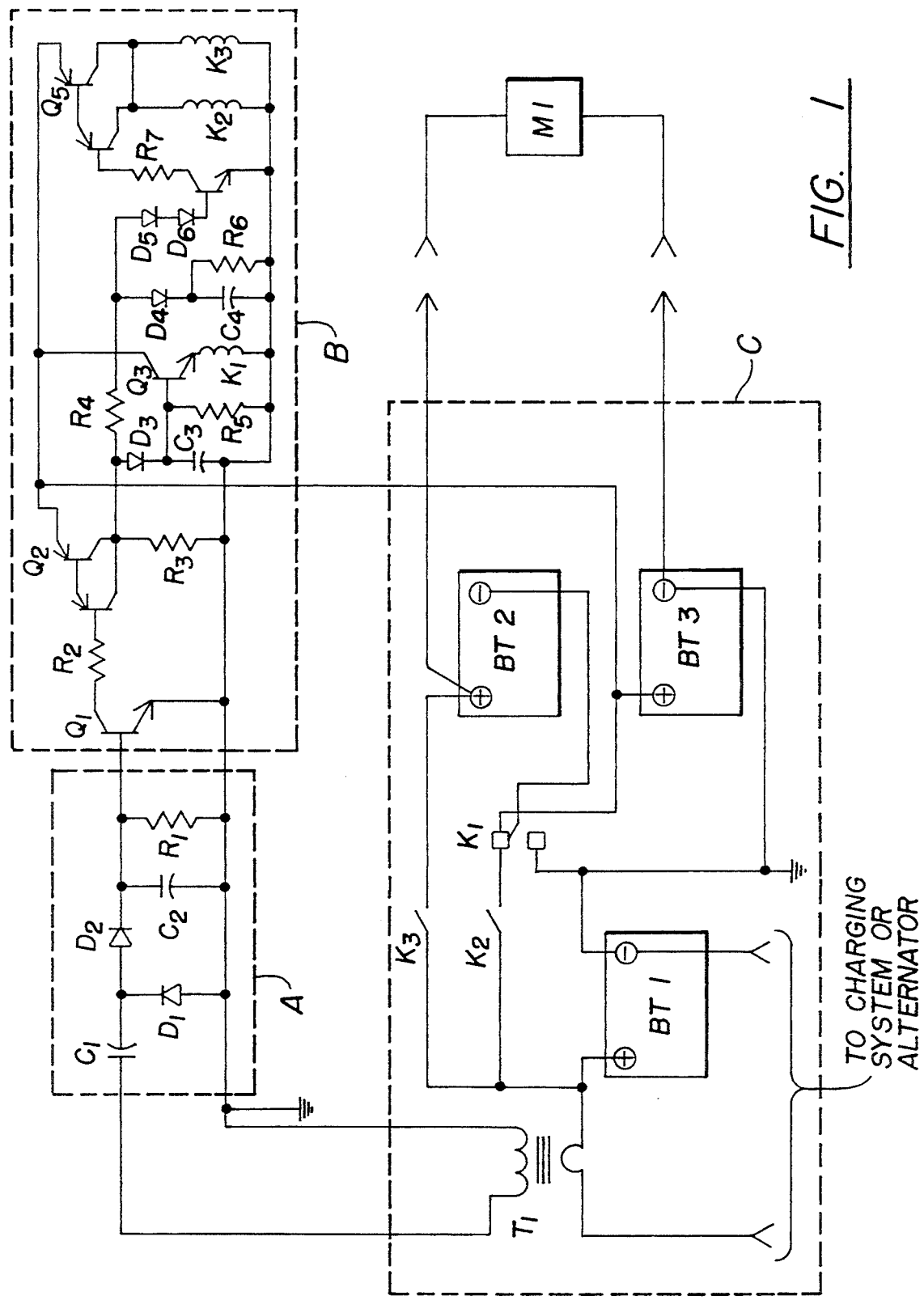
FIG. 1 is a schematic circuit diagram illustrating a preferred embodiment of the invention.

As shown in FIG. 1, the invention essentially consists of rectifier/filter circuit A, switching circuit B and battery wiring harness C. FIG. 1 depicts a state wherein no charging pulses are being delivered to the main battery BT1, i.e. the vehicle or boat motor is off. BT1 is, for example, a 12 volt car battery, motorboat battery, recreational vehicle (RV) battery, etc. Battery BT1 is the main battery of the boat or vehicle, i.e., the battery which is used for starting, for powering the ignition system and for powering other DC circuits (e.g., lights, horn, power windows, etc.) which may be provided on the vehicle or boat. Battery BT1 has a sufficient capacity to drive these loads, which typically are activated when the engine is running. Battery BT1 can also power auxiliary loads temporarily, but it would be dangerous to use the main battery for powering auxiliary loads which are operated over an extended time when the main engine is not operating to supplement the current drain (via an alternator) and/or to maintain main battery charge. Loads such as a trolling motor thus cannot be powered practically from the main battery BT1, due to the possibility that battery BT1 could discharge to the point that the main engine could not be started.

As shown in FIG. 1, which illustrates the vehicle "engine off" state, relays K2 and K3 are in the open position. Auxiliary batteries BT2 and BT3, preferably 12 volts each, are decoupled from main battery BT1 and the vehicle or boat charging system. Relay K1 in the position shown couples auxiliary batteries BT2 and BT3 in series across load M1. Load M1 can be any electrically powered device which is operated when the engine is off, and in the preferred embodiment shown and described, M1 is a 24 volt electric trolling motor or 24 V maximum power supply for an electric trolling motor, usable on fishing boats and the like.

After starting the main engine, the vehicle or boat alternator begins providing current for driving loads which are coupled to the electrical system. Alternator power charges the main battery and also powers any activated loads, via a voltage regulator as well known. The alternator is a form of generator which produces a sine wave current which is rectified and applied to the loads. A partly sinusoidal signal is thus developed (i.e., having DC and AC or time varying components), and according to a preferred embodiment of the invention the AC or time varying component of the alternator charging signal is sensed. The alternator begins delivering charging pulses to main battery BT1 when the engine is started and thus begins to turn the alternator.

According to the invention, the operation of the charging circuit is sensed and coupled to switching means which change the respective connections of the batteries, charging system and load depending on whether the charging system is active. In the embodiment shown, the primary winding of a transformer T1 is coupled in series between the positive terminal of battery BT1 and the vehicle or boat charging system. A secondary winding of transformer T1 is coupled to rectifier/filter circuit A. Rectifier/filter circuit A comprises a DC blocking series capacitor C1 and a parallel filter capacitor C2, parallel and series diodes D1 and D2, forming a full wave rectifier, and resistor R1, which determines the rate of discharge of capacitor C2, together with the base-emitter resistance of transistor Q1. Rectifier/filter circuit A produces a positive DC voltage at the base of transistor Q1 whenever the alternator is producing charging pulses. The collector of transistor Q1 is coupled through series resistor R2 and the base-emitter junction of PNP Darlington transistor Q2 to the positive terminals of parallel coupled auxiliary batteries BT2 and BT3 in the "engine off" mode shown. Transistor Q1 is thus biased and when the voltage at the base of transistor Q1 rises to 0.7 V due to the occurrence of alternator pulses, transistor Q1 begins to conduct.

The emitter of transistor Q2 is coupled to the positive terminal of battery BT3 when the engine is off, and to the positive terminal of battery BT1 when the engine is on (i.e., via the contact of relay K2). Optimally, battery BT3 has a voltage of around 12 volts. However, auxiliary battery BT3 may become discharged in use, and the voltage of BT3 could be much lower. It has been shown through experimentation that the voltage of auxiliary battery BT3 can fall as low as 6 volts without adversely affecting operation of the switching circuit B.

When transistor Q1 conducts, it pulls down the voltage at the base of transistor Q2, and Q2 conducts as we, 11. The collector of transistor Q2 is coupled to ground through biasing resistor R3. Current flowing from the collector of transistor Q2 flows through diode D3, raising the voltage on the base of transistor Q3 with charging of capacitor C3, coupled between the base of transistor Q3 and ground. Transistor Q3 then turns "on". The collector of transistor Q3 is coupled to the positive terminal of battery BT3 when the engine is off and is also connected to BT1 when the engine is on the emitter of transistor Q3 is coupled to ground through the coil of relay K1. Therefore, when transistor Q3 conducts, relay K1 is energized and changes state from that shown in FIG. 1. Relay K1 thus decouples batteries BT2 and BT3 from their pre-existing series configuration and couples them in parallel for charging.

Current from the collector of transistor Q2 also flows to the base of transistor Q4, thereby turning transistor Q4 "on". The base of transistor Q4 is coupled to the collector of transistor Q2 through series resistor R4 and two series coupled forward biased diodes D5, D6. Transistor Q4 turns "on" when the voltage at the anode of diode D5 exceeds about 2.1 V. The collector of transistor Q4 is coupled through biasing resistor R7 to the base of PNP Darlington pair Q5, and the emitter of Q5 is coupled to the positive supply voltage at the emitter of Q2. The collector of transistor Q5 is coupled to ground through the coils of relays K2 and K3, which are in parallel. Therefore, when transistors Q4 and Q5 conduct, relays K2 and K3 conduct. The contacts of relays K2 and K3 respectively couple the positive terminals of batteries BT2 and BT3 to the positive terminal of battery BT1, for charging.

When the alternator ceases providing an AC signal through transformer T1, the voltage at the base of transistor Q1 falls with the discharge of filter capacitor C2 through resistor R1 and the base-emitter junction of transistor Q1. However, the switching circuit does not instantaneously change state. Switching circuit B comprises RC timing components C3 and R5, in parallel between the base of transistor Q3 and ground to delay the change of state of relay coil K1 as capacitor C3 discharges through resistor R5 and through the coil of K1 via the base-emitter junction of transistor Q3. Similarly, timing components C4 and R6 delay the change of state of relay coils K2 and K3 as capacitor C4 discharges through resistor R6. Diode D4 blocks the discharge of capacitor C4 through transistor Q4, which continues to conduct until the voltage at the cathode of diode D4 falls below about 1.4 V. The timing components operate in such a way that upon initiation of charging current to main battery BT1 and the consequent application of a DC voltage level to transistor Q1, K1 will change state to decouple batteries BT2 and BT3 from their series configuration. Shortly thereafter, relays K2 and K3 engage to commence charging of batteries BT2 and BT3 in a parallel configuration.

The circuit therefore provides a non-shorting contact configuration which prevents generation of large currents upon changes of state. When operation of the vehicle or boat engine is terminated, thereby removing charging current pulses, the timing components of switching circuitry B cause K2 and K3 to open first, followed by a state change of relay K1 to switch batteries BT2 and BT3 into a series configuration across load M1. The timing components operating as described above thereby prevent the potentially destructive application of 24 volts from, for example a series connected BT2 and BT3 to, for example, the 12 volt rated main battery BT1 and charging system without using a series diode and its attendant voltage drop and power dissipation.

As can be seen from the above description, the invention provides means for transforming the charging pulses from a vehicle or boat battery charging system to a DC voltage level to activate switching circuitry to switch auxiliary batteries into the charging circuit for charging. The invention is especially useful in a fishing boat such as a bass boat having a 24 volt trolling motor or a trolling motor with a regulator having a 24 V input. When the fisherman starts the main (internal combustion) boat engine, auxiliary batteries BT2 and BT3 are switched into the battery charging system used normally to charge battery BT1. The boat then can be driven under the power of its internal combustion engine to a fishing site. When the internal combustion engine is switched off, the auxiliary batteries BT2 and BT3 are switched into a series configuration across the trolling motor for providing electrical power to the trolling motor. After trolling for some time and thus discharging the auxiliary batteries, the fisherman may wish to move to another part of the lake or river to try his luck at a different fishing spot. As the fisherman boats to the new spot under power of the internal combustion engine, the batteries are again and automatically switched into the charging circuit and are recharged and ready again for further use when the fisherman reaches the new destination.

The invention has additional installation possibilities. For example, the invention can be coupled to the charging system of an automobile or RV having a trailer for transporting a fishing boat or the like, via power supply couplings provided at the trailer hitch, for charging the auxiliary batteries when driving to the launch site. In a manner similar to the charging of the auxiliary batteries via the boat engine, as soon as the automobile or RV is started, the auxiliary batteries are switched into a parallel charging arrangement with the car or RV charging system.

Figure 2:
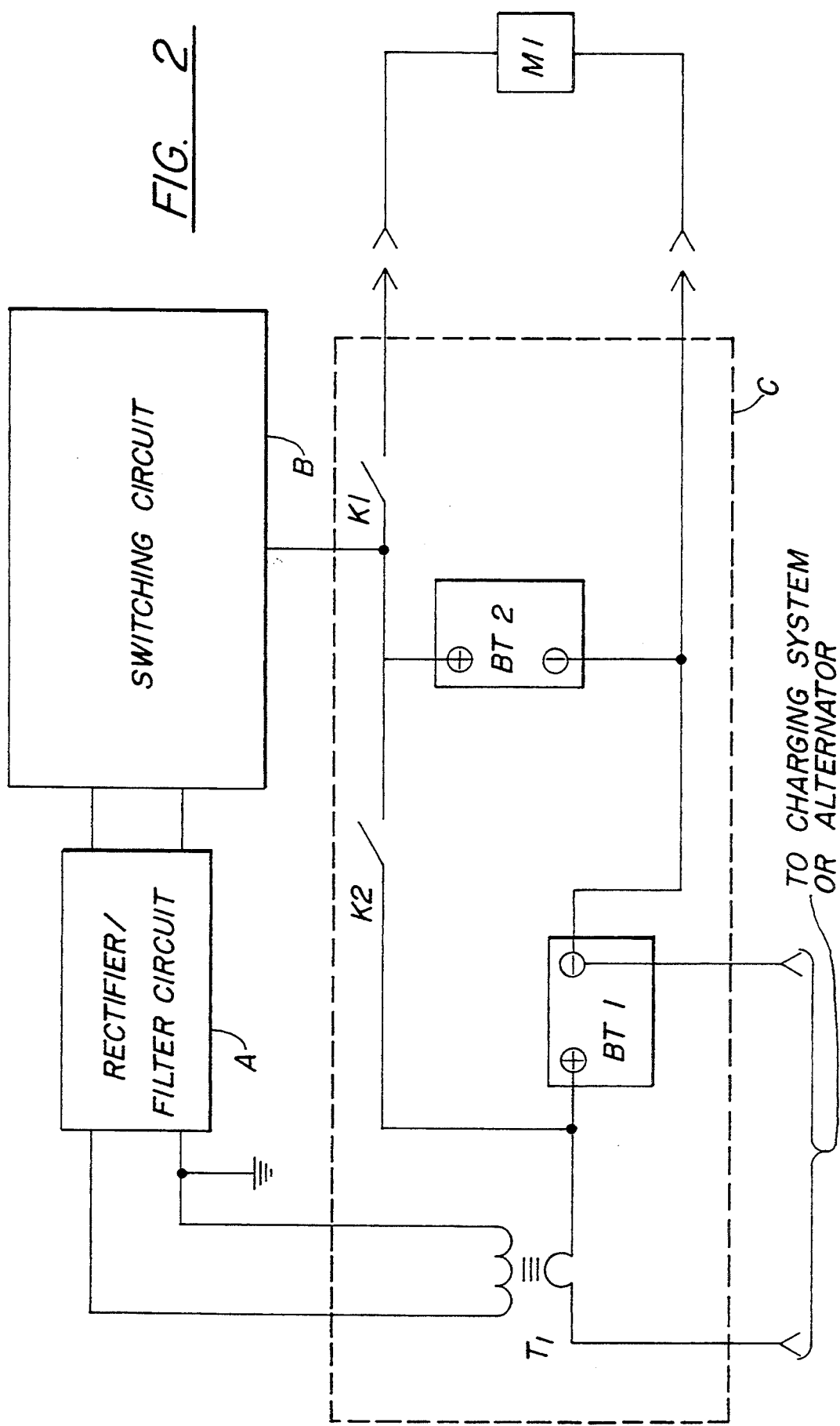
FIG. 2 is a schematic diagram of the invention as embodied with a single auxiliary battery.
Figure 3:
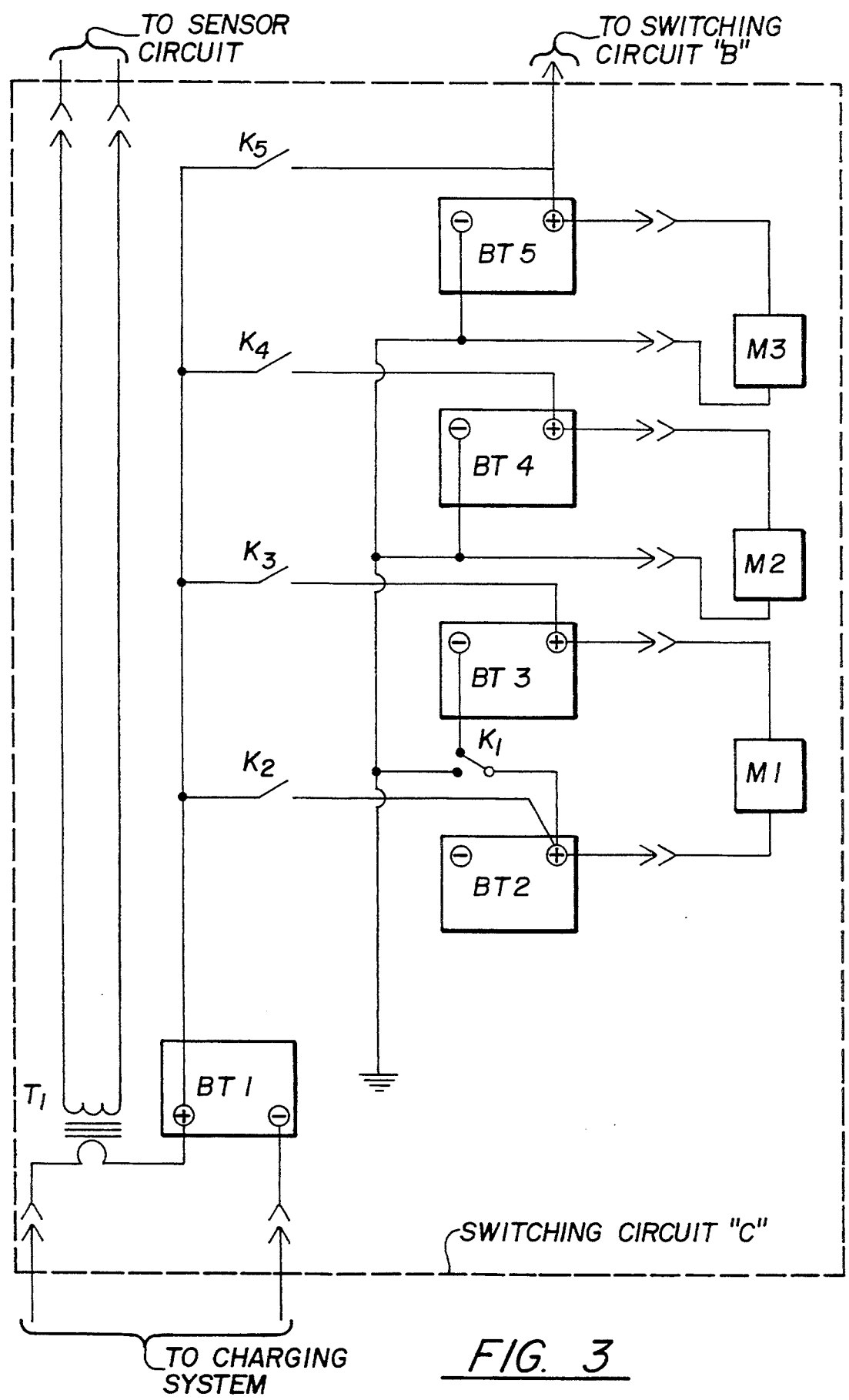
FIG. 3 is a schematic diagram of an alternative embodiment of the invention shown in FIG. 1 with two additional auxiliary batteries which can be connected to separate loads.

Although the invention has been described above for use with a pair of auxiliary batteries, it is within the scope of the invention to use a single auxiliary battery or more than a pair of auxiliary batteries, provided the charging system of the vehicle or boat can deliver sufficient charging current to the plurality of batteries in parallel. Use of the invention with a single auxiliary battery is depicted in FIG. 2.

In an alternative embodiment, the switching relays may be advantageously arranged such that two or more auxiliary batteries are placed in a parallel configuration for charging and are isolated from one another under load conditions, when they are not being charged. In the parallel configuration, each battery can be connected through switch relays such that it provides power only to certain loads. As a result, if a particular load causes one battery to become discharged, the remaining batteries will not be affected and will still be available to operate other equipment. In this embodiment the delay circuitry provided by C3, R5, C4 and R6 may optionally be omitted since the batteries are never connected in series. Alternatively, the batteries, under load conditions, may be connected in any suitable series and/or parallel configuration and may be and switched into a parallel configuration for charging. In either case, the switching relays may be controlled by a switching circuit similar to that shown in FIG. 2.

In a further alternative embodiment, a manual override switch can be provided for switching a main battery into a parallel configuration with one or more auxiliary batteries by means of switching relays. Under normal operating conditions, the switching relays can be arranged to connect the main and auxiliary batteries in parallel for charging. Any suitable parallel or series connection between the batteries can be provided by the switching relays under load conditions. When the manual override switch is activated, the switching circuit will cause the switching relays to place one or more auxiliary batteries in parallel with a main battery. In this way, if a main battery becomes discharged, sufficient energy can still be obtained from the auxiliary batteries for starting a vehicle engine. Once the vehicle engine is started, the override switch can be released for normal charging.

To modify the invention for use with more than two batteries, it is necessary only to add additional relays as required. For example, the additional relay coil for switching the batteries into a series configuration can be placed in parallel with the existing relay coil for relay K1. The additional batteries can be switched into the charging circuit by providing relays in addition to existing relays K2 and K3, coupled in parallel with the depicted coils for relays K2 and K3 or provided with a comparable driving circuit. For proper operation, of course, each battery should have a rated voltage at full charge equal to the rated voltage of the main battery and main battery charging system.

While specific embodiments of the invention have been described in detail, it will be appreciated that those skilled-in the art will now be aware of various modifications and alternatives to the foregoing preferred embodiments in light of the overall. teachings of this disclosure. Accordingly, the particular arrangements disclosed are meant to be illustrative only and not limiting as to the scope of the invention which is to be given the full breath of the appended claims and any and all equivalents thereof.

I claim:

1. A battery management system, comprising:
   a main battery;
   main battery charging system means coupled to the main battery for charging the main battery during a charging period;
   a plurality of auxiliary batteries;
   primary switching means for coupling said auxiliary batteries into a parallel configuration with the main battery charging system means and with said main battery when activated, the primary switching means also being operable to decouple the plurality of auxiliary batteries from said parallel configuration when deactivated; and,
   sensing means coupled to the primary switching means and operable to sense presence or absence of a time-varying component of a charging signal from said main battery charging system means to said main battery, the sensing means being operable to activate and deactivate said primary switching means based on the presence or absence of said time-varying component respectively; and,
   wherein said sensing means includes transformer means coupled to the charging signal for inducing a voltage, said voltage being applied to a switching circuit of said primary switching means.

2. The system as in claim 1, further comprising rectification and filtering means interposed between said sensing means and said switching circuit, said rectification and filtering means providing essentially a DC voltage for operating said switching circuit, the DC voltage being derived from the time-varying component of the charging signal.

3. The system as in claim 2, wherein said time-varying component is sinusoidal.

4. The system as in claim 2, wherein said time-varying component is comprised of a series of positive pulses.

5. The system as in claim 2, wherein said time-varying component is comprised of a series of negative pulses.

6. The system as in claim 1, further comprising secondary switching means responsive to said sensing means, said secondary switching means operable for switching at least one of said plurality of auxiliary batteries into a first load circuit separate from at least a second load circuit associated with a remainder of said plurality of auxiliary batteries, when said sensing means senses an absence of said time-varying component of said charging signal.

7. The system as in claim 6, wherein at least two of said auxiliary batteries are switched into said first load circuit and are coupled together in a series configuration by said secondary switching means.

8. The battery management system of claim 1, wherein said transformer means has a first winding coupled to the charging signal and a second winding coupled to said switching circuit, for operating the switching circuit in response to the time-varying component of the charging signal.

9. The battery management system of claim 8, further comprising rectification and filtering means interposed between said sensing means and said switching circuit, said rectification and filtering means for converting said time-varying component to a DC voltage for operating said switching circuit.

10. The system of claim 1, wherein said main battery charging system means includes an alternator.

11. The system of claim 1, wherein said main battery charging system is powered by an AC line voltage of a substantially 60 hz and 120 volts.

12. The system of claim 1, wherein said main battery is the on-board battery of a self-powered conveyance having an engine, and wherein said main battery provides at least power for ignition of said engine.

13. The system of claim 12, wherein the conveyance is one of an automobile, recreational vehicle and boat, wherein the engine is an internal combustion engine, and wherein the charging current is provided by an electric power generation means mechanically coupled to the engine.

14. The system of claim 6, wherein said first load circuit comprises an electric trolling motor.

15. The system of claim 1, wherein said main battery has a rated voltage of 12 volts and each of said auxiliary batteries has a rated voltage of 12 volts.

16. The system of claim 6, wherein said primary and secondary switching means comprise electromechanical relays.

17. The system of claim 6, wherein said primary and secondary switching means comprise solid state switching devices.

18. The system as in claims 7, further comprising delay means associated with the primary switching means, said delay means being operable to delay coupling of the at least two auxiliary batteries to said main battery until the secondary switching means changes state to decouple the at least two auxiliary batteries from series connection across the first load circuit.

19. The system as in claim 1, further comprising an override switch for manually activating said primary switching means to couple at least one auxiliary battery into a parallel configuration with the main battery, whereby said auxiliary battery can assist said main battery in providing power to start an engine.

20. A battery management system for controlling the configuration of at least one auxiliary battery in relation to a main battery charging system of a vehicle, said battery management system comprising:
   means for sensing the activation and deactivation of the main battery charging system; and
   switching means for connecting the at least one auxiliary battery to the main charging system for charging when the main battery charging system is activated and disconnecting the at least one auxiliary battery from the main charging system when the main battery charging system is deactivated, said switching means being activated by said sensing means, wherein the sensing means detects the presence or absence of charging current from the main battery charging system to determine whether the main battery charging system is activated or deactivated and wherein the sensing means has a transformer and senses a time varying component of the charging current.

* * * * *